(12) United States Patent
Tong

(10) Patent No.: US 11,041,317 B2
(45) Date of Patent: Jun. 22, 2021

(54) LOOSE LAY PLASTIC FLOOR AND PREPARATION METHOD THEREOF

(71) Applicant: Jiangsu Zhongsheng New Building Materials Co., Ltd, Zhenjiang (CN)

(72) Inventor: Yi Tong, Zhenjiang (CN)

(73) Assignee: Jiangsu Zhongsheng New Building Materials Co., Ltd, Zhenjiang (CN)

( * ) Notice: Subject to any disclaimer, the term of this patent is extended or adjusted under 35 U.S.C. 154(b) by 0 days.

(21) Appl. No.: 16/553,193

(22) Filed: Aug. 28, 2019

(65) Prior Publication Data

US 2020/0318362 A1 Oct. 8, 2020

(30) Foreign Application Priority Data

Apr. 4, 2019 (CN) .......................... 201910273046.3

(51) Int. Cl.

| | |
|---|---|
| *E04F 15/00* | (2006.01) |
| *B32B 5/00* | (2006.01) |
| *B32B 27/00* | (2006.01) |
| *B32B 7/00* | (2019.01) |
| *B32B 37/00* | (2006.01) |
| *E04F 15/10* | (2006.01) |
| *B32B 5/24* | (2006.01) |
| *B32B 27/30* | (2006.01) |
| *B32B 7/02* | (2019.01) |
| *B32B 37/10* | (2006.01) |
| *B32B 37/12* | (2006.01) |
| *B32B 37/06* | (2006.01) |

(52) U.S. Cl.
CPC .......... *E04F 15/105* (2013.01); *E04F 15/107* (2013.01); *B32B 5/245* (2013.01); *B32B 7/02* (2013.01); *B32B 27/304* (2013.01); *B32B 37/06* (2013.01); *B32B 37/1009* (2013.01); *B32B 37/1207* (2013.01); *B32B 2037/1215* (2013.01); *B32B 2307/554* (2013.01); *B32B 2307/71* (2013.01); *B32B 2307/75* (2013.01); *B32B 2471/00* (2013.01)

(58) Field of Classification Search
None
See application file for complete search history.

(56) References Cited

U.S. PATENT DOCUMENTS

| | | | |
|---|---|---|---|
| 10,494,822 B2 * | 12/2019 | Song | E04F 15/02172 |
| 10,774,541 B2 * | 9/2020 | Zhang | C04B 26/08 |
| 2009/0031662 A1 * | 2/2009 | Chen | E04F 15/02172 |
| | | | 52/515 |

* cited by examiner

*Primary Examiner* — Linda L Gray
(74) *Attorney, Agent, or Firm* — Bayramoglu Law Offices LLC

(57) ABSTRACT

A preparation method of a loose lay plastic floor includes the following steps: (a) subjecting a wear layer, a printing layer, a semi-rigid PVC layer, a core layer and an adsorption layer to hot-melt compounding and shaping to obtain a composite board; (b) coating one or more layers of UV coating on a surface of the wear layer of the composite board; and (c) subjecting the composite board coated with the UV coating to tempering, conditioning and punching to obtain a loose lay plastic floor. The core layer is a stone plastic core (SPC), a wood plastic core (WPC), a high density fiberboard (HDF), or a medium density fiberboard (MDF).

9 Claims, 2 Drawing Sheets

LOOSE LAY PLASTIC FLOOR AND PREPARATION METHOD THEREOF

CROSS REFERENCE TO THE RELATED APPLICATIONS

This application is based upon and claims priority to Chinese Patent Application No. 201910273046.3, filed on Apr. 4, 2019, the entire contents of which are incorporated herein by reference.

TECHNICAL FIELD

Embodiments of the present disclosure relate to the technical field of floor, and in particular to a loose lay plastic floor and a preparation method thereof.

BACKGROUND ART

Plastic floor is another name of polyvinyl chloride (PVC) floor, and a main component thereof is the PVC material. The PVC floor can be divided into two types, wherein one type is homogenous, that is, the material used for the floor is consistent from bottom to surface, and the other type is a composite type. The PVC floor is widely used in various fields such as commercial and domestic due to its rich colors and diverse patterns. The plastic floor is nowadays a new type of lightweight ground-decoration material that is very popular in the world, also known as "lightweight floor material"; and it is a popular product in Europe, America as well as in Japan and South Korea in Asia. It has been popular abroad and entered the Chinese market since the early 1980s, and has so far received common recognition in large and medium-sized cities in China, with a wide range of applications in various sites such as indoor homes, hospitals, schools, office buildings, factories, public places, supermarkets, businesses, sports venues and the like.

At present, the plastic sheet floor on the market includes luxury vinyl tile (LVT), stone plastic core (SPC), and wood plastic core (WPC), and these products need to be glued or locked when being laid. The glue contains substances harmful to the human body, and the locks also result in obvious additional loss. The above two ways of fixing are cumbersome, consuming a large amount of labor and materials, which is not advantageous for disassembly; currently, the loose lay plastic floor can be used to avoid use of glue and lock for fixing during installation, but the existing loose lay plastic floor has problems of thermal expansion, cold shrinkage, dimensional stability and poor flatness.

SUMMARY

To this end, an embodiment of the present disclosure provides a method of preparing a loose lay plastic floor so as to solve the problems of thermal expansion, cold shrinkage, dimensional stability and poor flatness of the loose lay plastic floor in the conventional technology.

In order to achieve the above object, embodiments of the present disclosure provide the following technical solutions.

According to a first aspect of the embodiments of the present disclosure, a method of preparing a loose lay plastic floor is provided, the method including the following steps:

(a) subjecting a wear layer, a printing layer, a semi-rigid PVC layer, a core layer and an adsorption layer to hot-melt compounding and shaping to obtain a composite board;

(b) coating one or more layers of UV coating on a surface of the wear layer of the composite board; and (c) subjecting the composite board coated with the UV coating to tempering, conditioning and punching to obtain a loose lay plastic floor.

The present disclosure can improve the structural stability and structural strength of the product by hot-melt compounding several layers of sheets, and can improve the quality of the prepared loose lay plastic floor, and the loose lay plastic floor prepared by the above method exhibits more excellent dimensional stability and flatness at different temperatures.

Further, the preparation method further includes edge-cutting and chamfering the punched composite board. By edge-cutting and chamfering the composite board, the present disclosure can reduce the gaps generated in assembling the loose lay plastic floors and improve the assembling effect.

Further, the core layer of the present disclosure is selected from any one of stone plastic core (SPC), wood plastic core (WPC), high density fiberboard (HDF), and medium density fiberboard (MDF).

Further, in a case that the core layer is the SPC, the composite board is obtained by hot-melt compounding in the following way:

stacking a wear layer, a printing layer, a semi-rigid layer and an adsorption layer sequentially, disposing the semi-rigid PVC layer between the core layer and the printing layer and/or between the core layer and the adsorption layer, followed by hot-melt compounding and shaping to obtain the composite board.

Further, if a case that the core layer is WPC, HDF or MDF, the composite board is prepared by the following method:

Adhesively bonding an upper composite layer, a core layer and a lower composite layer to obtain the composite board, the upper composite layer being obtained by hot-melt compounding a wear layer and a printing layer and shaping, and the lower composite layer including an adsorption layer.

Further, the adhesively bonding includes cold adhesive bonding or hot-melt adhesive bonding; preferably, the cold adhesive bonding refers to bonding for 8-48 hours at a temperature of 15-35° C. and a pressure of 0.4-2.5 MPa after the adhesive is applied, the hot-melt adhesive bonding refers to fast-bonding at a temperature of 150-220° C., and the adhesive used for bonding is polyurethane (PUR) hot-melt adhesive.

Further, the upper composite layer includes a semi-rigid PVC layer.

Further, the lower composite layer includes a semi-rigid PVC layer, and is obtained by hot-melt compounding the semi-rigid PVC layer and an adsorption layer and shaping.

Further, during the hot-melt compounding, the temperature is controlled at 125-175° C., the pressure is controlled at 2.0-8.5 MPa, and a time duration is controlled at 15-45 minutes; preferably, the hot-melt compounding is performed under vacuum.

Further, the shaping is performed for 15-45 minutes at a temperature of no higher than 80° C. and a pressure of 0.0-8.5 MPa.

Further, a temperature of the tempering is 70-95° C., and a time duration of the tempering is 2-15 minutes.

Further, the conditioning is to place the composite board at 20-26° C. for 24-48 hours; preferably, the conditioning is to place the composite board at 23-26° C. for 48-72 hours.

By defining the above parameters, the present disclosure can better promote the compounding of the materials of various layers, reduce the internal stress between the layers, and obviously improve the quality of the prepared product.

Further, the UV coating has a grammage of 8-22 g/m². By defining the grammage of the UV coating, the product can be improved in terms of abrasion resistance, stain resistance and cleaning easiness.

Further, the semi-rigid PVC layer is made of components of the following percentages:

PVC resin: 10.2-36. 2%; $CaCO_3$: 59.8-82.9%; DOTP: 4.8-14.7%; modifier: 0-5.9%; and stabilizer: 0.2-1.8%;

Further, the semi-rigid PVC layer is made of components of the following percentages:

PVC resin: 13.6%; $CaCO_3$: 74.6%; DOTP: 8.4%; modifier: 3.1%; and stabilizer: 0.3%.

By defining the components of the semi-rigid PVC layer, the present disclosure can better improve the dimensional stability of the prepared loose lay plastic floor at different temperatures.

Further, the modifier is selected from any one or more of butadiene-acrylonitrile rubber, polyvinyl chloride-vinyl acetate copolymer resin, chlorinated polyethylene, and acrylate.

Further, the stabilizer is zinc stearate and calcium stearate.

Further, the semi-rigid PVC layer can be prepared by a conventional preparation method in the art.

Further, the wear layer is made of PVC material, and has a thickness of 0.1-1.0 mm.

Further, the printing layer is made of PVC material, and has a thickness of 0.05-0.09 mm.

Further, the semi-rigid PVC layer has a thickness of 0.7-3.0 mm.

Further, the adsorption layer is made of TPU material or PVC micro foaming material, and has a thickness of 0.02-0.7 mm.

Further, the core layer has a thickness of 1-6 mm.

According to a second aspect of the embodiments of present disclosure, the loose lay plastic floor is provided, which is prepared by the above preparation method.

The above loose lay plastic floor of the present disclosure has excellent dimensional stability and flatness.

Embodiments of the present disclosure have the following advantages:

(1) The present disclosure can improve the structural stability and structural strength of the product by hot-melt compounding various layers of sheets, and can improve the quality of the prepared loose lay plastic floor, and the loose lay plastic floor prepared by the above method exhibits more excellent dimensional stability and flatness at different temperatures.

(2) By defining the parameters for hot-melt compounding, the present disclosure can better promote the compounding of the materials of various layers, reduce the internal stress between the layers, and better improve the quality of the prepared product.

BRIEF DESCRIPTION OF THE DRAWINGS

The accompanying drawings that are required to be used in the description of the embodiments or the conventional technology are described briefly below, so that the technical solutions according to the embodiments of the present disclosure or according to the conventional technology will become clearer. It is apparent that the accompanying drawings in the following description are only illustrative. For those skilled in the art, other accompanying drawings may be obtained according to these drawings provided, without any creative work.

The structure, proportion, size and the like shown in the present specification are only used to cooperate with the contents disclosed in the specification for those skilled in the art to understand and read, and are not intended to limit the conditions with which the present disclosure can be implemented. Therefore, they have no practical significance in a technical sense. Any modification to the structure, any change of the proportions or any adjustment of the size should fall within the scope covered by the technical contents disclosed in the present disclosure without influencing the effects and objects that can be achieved by the present disclosure.

Figure 1:
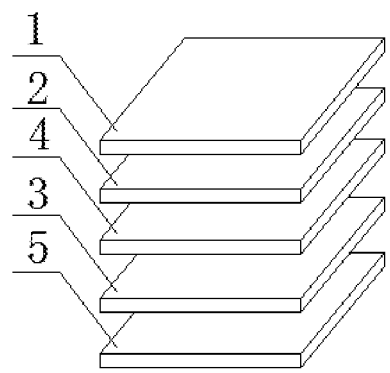
FIG. 1 is a schematic exploded view of a loose lay plastic floor prepared according to Embodiment 1 of the present disclosure.

In the drawings: 1—wear layer; 2—printing layer; 3—semi-rigid PVC layer; 4—core layer; 5—adsorption layer.

DETAILED DESCRIPTION OF THE EMBODIMENT

The implementations of the present disclosure will be described in the specific embodiments below, and other advantages and functions of the present disclosure can be readily understood by those skilled in the art from the contents disclosed in the specification. It is apparent that the described embodiments are part of the embodiments of the present disclosure, instead of all of them. All the other embodiments obtained by those skilled in the art on the basis of the embodiments of the present disclosure without creative efforts will fall within the scope of protection of the present disclosure.

The raw materials used in the following embodiments are listed as follows:

a wear layer: the material being PVC, from Zhenjiang Sansheng Plastic Industry Co., Ltd.;

a printing layer: the material being PVC, from Kunshan Big Orange Decoration Materials Co., Ltd.;

an adsorption layer: the material being TPU, from Wenzhou Yinrun Packaging Co., Ltd.;

a medium density fiberboard: from Wenzhou Yinrun Packaging Co., Ltd.;

a wood plastic core: from Huzhou Yitong Decoration Materials Co., Ltd.; and a stone plastic core: from Jiangsu Zhongsheng Building New Material Co., Ltd.

Embodiment 1

This embodiment is a method of preparing a loose lay plastic floor, and the preparation method includes the following steps:

(a) bonding an upper composite layer, a core layer 4 having a thickness of 3 mm and a lower composite layer by using a PUR adhesive at a temperature of 20° C. and a pressure of 2.0 MPa for 24 hours to obtain a composite board, the upper composite layer being obtained by hot-melt compounding a wear layer 1 having a thickness of 0.1 mm and a printing layer 2 having a thickness of 0.09 mm at a temperature of 125° C. and a pressure of 7.5 MPa for 45 minutes, followed by shaping at a temperature of 60° C. and a pressure of 8 MPa for 45 minutes; and the lower composite layer being obtained by hot-melt compounding a semi-rigid PVC layer 3 having a thickness of 3.0 mm and an adsorption layer 5 having a thickness of 0.1 mm at a temperature of 125° C. and a pressure of 7.5 MPa for 45 minutes, followed by shaping at a temperature of 60° C. and a pressure of 8 MPa for 45 minutes;

wherein the core layer 4 is a medium density fiberboard, and the semi-rigid PVC layer 3 is prepared from the following raw materials: PVC resin: 12.1%; $CaCO_3$: 82.9%; DOTP: 4.8%; and stabilizer: 0.2%;

(b) coating a surface of the wear layer of the composite board with a UV coating, wherein the UV coating has a grammage of 10 $g/m^2$; and (c) tempering the composite board coated with UV coating by heating it to 90° C., keeping the temperature for 5 minutes, then placing the composite board at 20° C. for 72 hours, and punching, edge-cutting and chamfering the composite board according to customer requirements to obtain a loose lay plastic floor as shown in FIG. 1.

Embodiment 2

Figure 2:
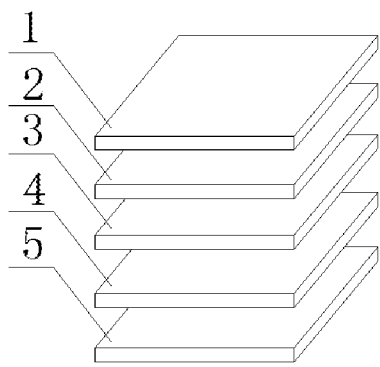
FIG. 2 is a schematic exploded view of a loose lay plastic floor prepared according to Embodiment 2 of the present disclosure.

This embodiment is a method of preparing a loose lay plastic floor, and the preparation method includes the following steps:

(a) fast bonding an upper composite layer, a core layer 4 having a thickness of 4 mm and a lower composite layer by using a PUR hot-melt adhesive at a temperature of 200° C. to obtain a composite board, the upper composite layer being obtained by hot-melt compounding a wear layer 1 having a thickness of 0.3 mm, a printing layer 2 having a thickness of 0.05 mm and a semi-rigid PVC layer 3 having a thickness of 0.7 mm at a temperature of 175° C. and a pressure of 7.5 MPa for 15 minutes, followed by shaping at a temperature of 60° C. and a pressure of 8.5 MPa for 15 minutes, and the lower composite layer being an adsorption layer 5 having a thickness of 0.5 mm;

wherein the core layer 4 is a wood plastic composite, and the semi-rigid PVC layer is prepared from the following raw materials: PVC resin: 18%; $CaCO_3$: 63%; DOTP: 11.3%; butadiene-acrylonitrile rubber: 5.9%; and stabilizer: 1.8%;

(b) coating a surface of the wear layer of the composite board with a UV coating, wherein the UV coating has a grammage of 18 $g/m^2$; and (c) tempering the composite board coated with UV coating by heating it to 80° C., keeping the temperature for 15 minutes, then placing the composite board at 26° C. for 72 hours, and punching, edge-cutting and chamfering the composite board according to customer requirements to obtain a loose lay plastic floor as shown in FIG. 2.

Embodiment 3

Figure 3:
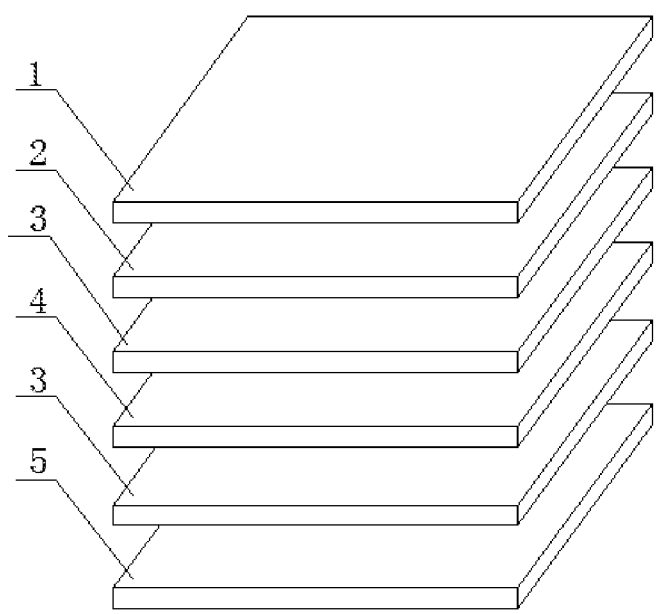
FIG. 3 is a schematic exploded view of a loose lay plastic floor prepared according to Embodiment 3 of the present disclosure.

This embodiment is a method of preparing a loose lay plastic floor, and the preparation method includes the following steps:

(a) hot-melt compounding a wear layer 1 having a thickness of 0.6 mm, a printing layer 2 having a thickness of 0.06 mm, a semi-rigid PVC layer 3 having a thickness of 1.2 mm, a core layer 4 having a thickness of 3 mm, a semi-rigid PVC layer 3 having a thickness of 1.2 mm and an adsorption layer 5 having a thickness of 0.4 mm, which are sequentially stacked, at a temperature of 150° C. and a pressure of 6 MPa under vacuum for 25 minutes, followed by shaping at a temperature of 60° C. and a pressure of 7 MPa for 20 minutes to obtain a composite board;

wherein the core layer 4 is a stone plastic core, and the semi-rigid PVC layer 3 is prepared from the following raw materials: PVC resin: 23.6%; $CaCO_3$: 64.3%; DOTP: 8.4%; polyvinyl chloride-vinyl acetate copolymer rubber: 1.7%; butadiene-acrylonitrile rubber: 1.1%; and stabilizer: 0.9%;

(b) coating a surface of the wear layer of the composite board with a UV coating, wherein the UV coating has a grammage of 15 $g/m^2$; and (c) tempering the composite board coated with UV coating by heating it to 95° C., keeping the temperature for 2 minutes, then placing the composite board at 24° C. for 60 hours, and punching, edge-cutting and chamfering the composite board according to customer requirements to obtain a loose lay plastic floor as shown in FIG. 3.

Comparative Example 1

The comparative example is a method of preparing a loose lay plastic floor, and the preparation method is basically the same as the preparation method of Embodiment 3, except that in step (a), the core layer having a thickness of 3.0 mm is replaced with a mesh glass fiber layer having a thickness of 0.1 mm, and the semi-rigid PVC layer has a thickness of 2.7 mm.

Comparative Example 2

The comparative example is a method of preparing a loose lay plastic floor, and the preparation method is basically the same as the preparation method of Embodiment 3, except that in step (a), the core layer having a thickness of 3.0 mm is replaced with a semi-rigid PVC layer having a thickness of 3 mm.

Experimental Example 1

The loose lay plastic floor was cut into ten pieces of the same size. Firstly, the ten pieces of loose lay plastic floors were placed at a temperature of 20° C. for 4 hours, and the sizes of the samples were measured. Five samples were placed at a temperature of 50° C. for 4 hours, and the sizes of the samples were measured; the other five samples were placed at a temperature of 0° C. for 4 hours, and the sizes of the samples were measured; and a dimensional elongation or reduction rate at each temperature was calculated.

The loose lay plastic floor prepared by Embodiment 3 and the loose lay plastic floors prepared by comparative examples 1 and 2 were respectively selected, and then these selected loose lay plastic floors were respectively tested by using the above method: the above experiment was repeated for six times, a dimensional change at another temperature as compared to a standard size at 20° C. is recorded, and a calculation result is shown in Table 1.

TABLE 1

| Type | 50° C. | 20° C. | 0° C. |
|---|---|---|---|
| Embodiment 3 | +0.069% | — | −0.037% |
| Comparative example 1 | +0.142% | — | −0.098% |
| Comparative example 2 | +0.173% | — | −0.126% |

As can be seen from Table 1, the loose lay plastic floor prepared by the present application exhibits more excellent dimensional stability and flatness at different temperatures.

Experimental Example 2

The loose lay plastic floor prepared by Embodiment 3 and the loose lay plastic floors prepared by comparative examples 1 and 2 were respectively selected, and a heating dimensional change rate and a heating warpage of the obtained floors were tested according to the test method of ASTM F2199. A test result is shown in Table 2:

TABLE 2

| Type | heating dimensional change rate | heating warpage |
| --- | --- | --- |
| Embodiment 3 | 0.03% | −0.1 mm |
| Comparative example 1 | 0.08% | −0.8 mm |
| Comparative example 2 | 0.13% | −0.8 mm |

As can be seen from Table 2, the loose lay plastic floor prepared by the present application has smaller heating dimensional change rate and heating warpage than the comparative examples 1 and 2. Therefore, the loose lay plastic floor prepared by the present application has excellent dimensional stability and flatness.

While the present disclosure is described in detail with reference to the specific embodiments and general description above, it is apparent to those skilled in the art that some modifications or improvements may be made on the basis of the present disclosure. Therefore, such modifications or improvements made without departing from the spirit of the present disclosure will all fall within the scope of protection of the present disclosure.

What is claimed is:

1. A method of preparing a loose lay plastic floor, comprising the following steps:
   (a) subjecting a wear layer, a printing layer, a semi-rigid polyvinyl chloride (PVC) layer, a core layer and an adsorption layer to hot-melt compounding and shaping to obtain a composite board;
   (b) coating at least one layer of ultraviolet (UV) coating on a surface of the wear layer of the composite board; and
   (c) subjecting the composite board coated with the at least one layer of UV coating to tempering, conditioning and punching to obtain the loose lay plastic floor;
   wherein a temperature of the tempering is 70-95° C., and a time duration of the tempering is 2-15 minutes, and the conditioning is to place the composite board at 20-28° C. for 48-72 hours.

2. The method according to claim 1, wherein the core layer is a stone plastic core (SPC), the semi-rigid PVC layer comprises a first semi-rigid PVC layer and a second semi-rigid PVC layer, and the composite board is obtained by the hot-melt compounding by the following steps:
   stacking the wear layer, the printing layer, the first semi-rigid PVC layer, the second semi-rigid PVC layer and the adsorption layer sequentially, disposing the first semi-rigid PVC layer between the core layer and the printing layer and disposing the second semi-rigid PVC layer between the core layer and the adsorption layer; and performing the hot-melt compounding and the shaping to obtain the composite board.

3. The method according to claim 1, wherein the core layer is either a wood plastic core (WPC), a high density fiberboard (HDF), or a medium density fiberboard (MDF), the semi-rigid PVC layer comprises a first semi-rigid PVC layer and a second semi-rigid PVC layer, and the composite board is prepared by the following step:
   adhesively bonding an upper composite layer, the core layer and a lower composite layer to obtain the composite board by a hot melt adhesive, wherein
   the upper composite layer comprises the wear layer, the first semi-rigid PVC layer and the printing layer and is obtained by performing the hot-melt compounding on the wear layer, the first semi-rigid PVC layer and the printing layer and the shaping, and
   the lower composite layer comprises the adsorption layer and the second semi-rigid PVC layer and is obtained by performing the hot-melt compounding on the second semi-rigid PVC layer and an adsorption layer and the shaping.

4. The method according to claim 1, wherein during the hot-melt compounding, a temperature is controlled at 125-175° C., a pressure is controlled at 0.0-8.5 MPa, and a time duration is controlled at 15-45 minutes; and
   the shaping is performed for 15-45 minutes at a temperature of no higher than 80° C. and a pressure of 2.0-8.5 MPa.

5. The method according to claim 1, wherein the semi-rigid PVC layer comprises:
   10.2-36.2% of PVC resin; 59.8-82.9% of $CaCO_3$; 4.8-14.7% of dioctyl terephthalate (DOTP); 0-5.9% of modifier; and 0.2-1.8% of stabilizer.

6. The method according to claim 5, wherein the modifier is at least one selected from the group consisting of butadiene-acrylonitrile rubber, polyvinyl chloride-vinyl acetate copolymer resin, chlorinated polyethylene, and acrylate.

7. The method according to claim 1, wherein the wear layer is made of PVC material, and has a thickness of 0.1-1.0 mm;
   the printing layer is made of PVC material, and has a thickness of 0.05-0.09 mm;
   the semi-rigid PVC layer has a thickness of 0.7-3.0 mm;
   the adsorption layer is made of thermoplastic polyurethane (TPU) material or PVC micro foaming material, and has a thickness of 0.02-0.7 mm; and
   the core layer has a thickness of 1-6 mm.

8. The method according to claim 2, wherein during the hot-melt compounding, a temperature is controlled at 125-175° C., a pressure is controlled at 2.0-8.5 MPa, and a time duration is controlled at 15-45 minutes; and
   the shaping is performed for 15-45 minutes at a temperature of no higher than 80° C. and a pressure of 2.0-8.5 MPa.

9. The method according to claim 3, wherein during the hot-melt compounding, a temperature is controlled at 125-175° C., a pressure is controlled at 2.0-8.5 MPa, and a time duration is controlled at 15-45 minutes; and
   the shaping is performed for 15-45 minutes at a temperature of no higher than 80° C. and a pressure of 2.0-8.5 MPa.

* * * * *